Sept. 17, 1968   J. H. LANDVATER   3,401,761
DEVICE FOR LOADING ADDITIONAL COUNTERBALANCE WEIGHT
TO BEAM BALANCE WEIGHING SCALES
Filed Jan. 13, 1966   3 Sheets-Sheet 1

INVENTOR
JOHN H. LANDVATER
BY Richards & Cifelli
ATTORNEYS

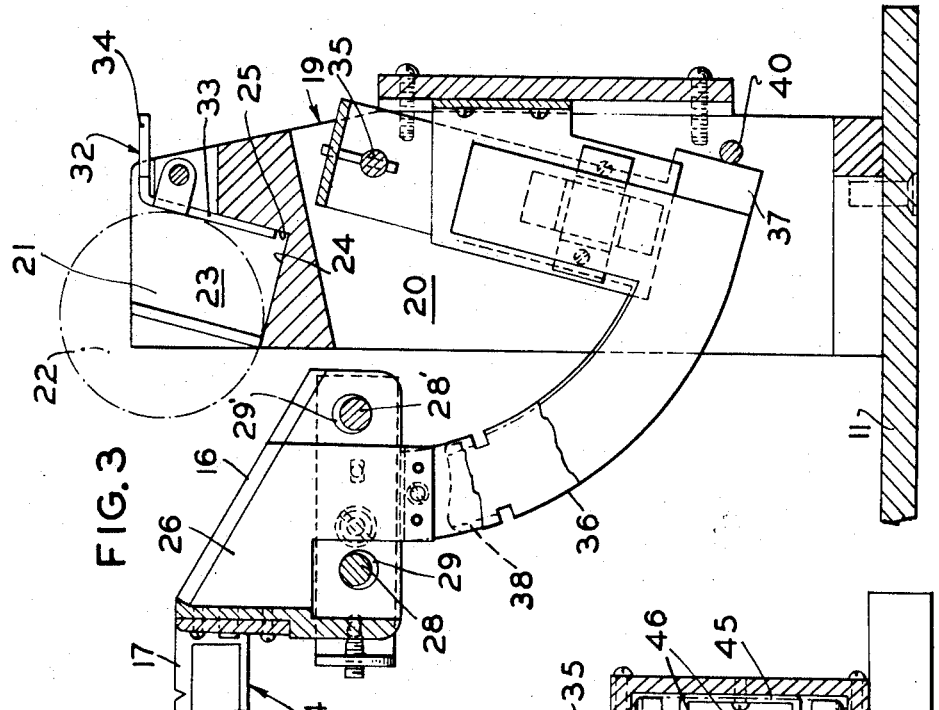
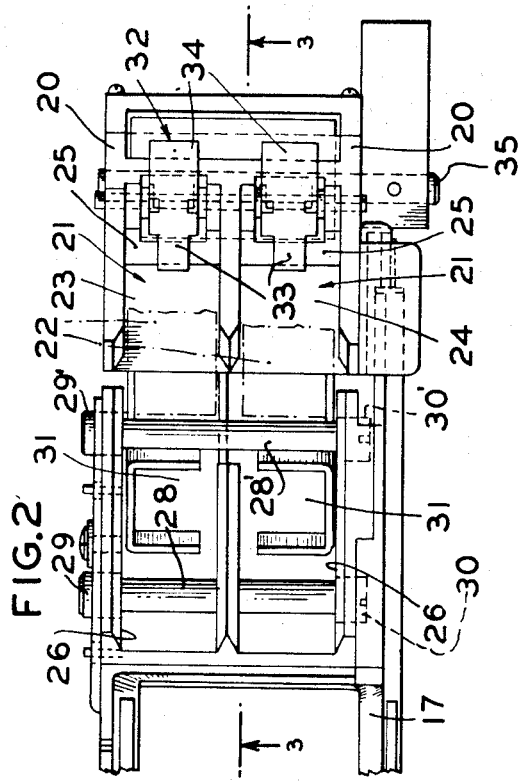
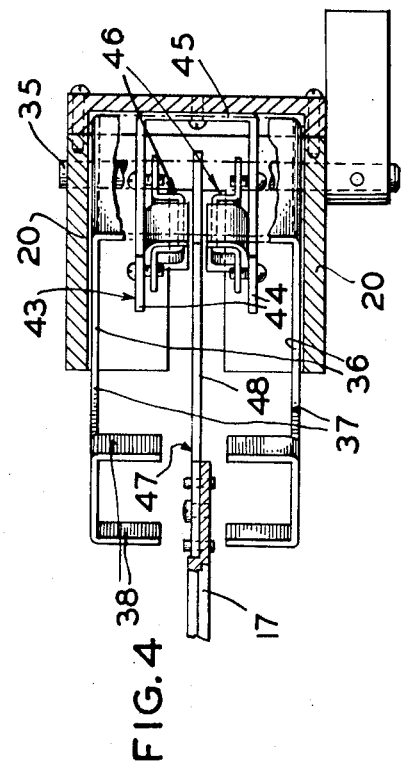
INVENTOR
JOHN H. LANDVATER
BY Richards & Cifelli
ATTORNEYS Sept. 17, 1968   J. H. LANDVATER   3,401,761
DEVICE FOR LOADING ADDITIONAL COUNTERBALANCE WEIGHT
TO BEAM BALANCE WEIGHING SCALES
Filed Jan. 13, 1966   3 Sheets-Sheet 3

INVENTOR
JOHN H. LANDVATER
BY Richards & Cifelli
ATTORNEYS

__United States Patent Office__

3,401,761
Patented Sept. 17, 1968

3,401,761
DEVICE FOR LOADING ADDITIONAL COUNTERBALANCE WEIGHT TO BEAM BALANCE WEIGHING SCALES
John H. Landvater, South Berkley Heights, N.J., assignor to Ohaus Scale Corporation, Union, N.J., a corporation of New Jersey
Filed Jan. 13, 1966, Ser. No. 520,327
3 Claims. (Cl. 177—248)

ABSTRACT OF THE DISCLOSURE

Beam balance weighing scales which are provided with additional counterbalance weights and means to move them between an out-of-use position in a storage rack and an in-use position in a weight receiving means located on the beam at its outer end; the weight receiving means on the beam being capable of automatically positioning the added weight at a precise predetermined distance from the fulcrum with means for adjusting the distance of the added weight from the fulcrum to calibrate the scale.

---

This invention relates to beam balance weighing scales of the type wherein the rear arm of the pivoted beam carries a platform to receive the weight to be measured, and the forward weight measuring arm of said beam is provided with an adjustable poise to balance the weight to be measured up to a predetermined maximum; additional counterbalance weight being attachable to said weight measuring arm when the weight to be measured exceeds the capacity of the beam poise adjustment.

It is an object of this invention to provide a novel and quickly manipulatable means for mounting on, and thus adding to, the measuring arm of the beam additional counterbalance weight, and, after use, to remove such additional weight from said measuring arm of the beam for return to a normal out-of-service support which forms a part of the scale structure.

It is another object of this invention to provide adjustable or fixed means associated with the measuring arm of the beam for receiving an additional counterbalance weight dropped or placed therein, and, automatically and accurately positioning said weight with respect to the fulcrum.

The above-stated and other objects will become apparent from a reading of the following description of illustrative embodiments of this invention in connection with the accompanying drawings thereof, in which drawings:

FIG. 2 is an enlarged fragmentary top plan view of the additional weight manipulating means and the weight receiving means with which the free end of the scale weight measuring arm is provided;

FIG. 3 is a vertical longitudinal sectional view, taken on line 3—3 in FIG. 2;

FIG. 4 is a fragmentary horizontal sectional view, taken on line 4—4 in FIG. 1, and more particularly showing the weight return or unloading means of the weight manipulating device;

Like characters of reference are applied in the above-described views to indicate corresponding parts.

Figure 1:
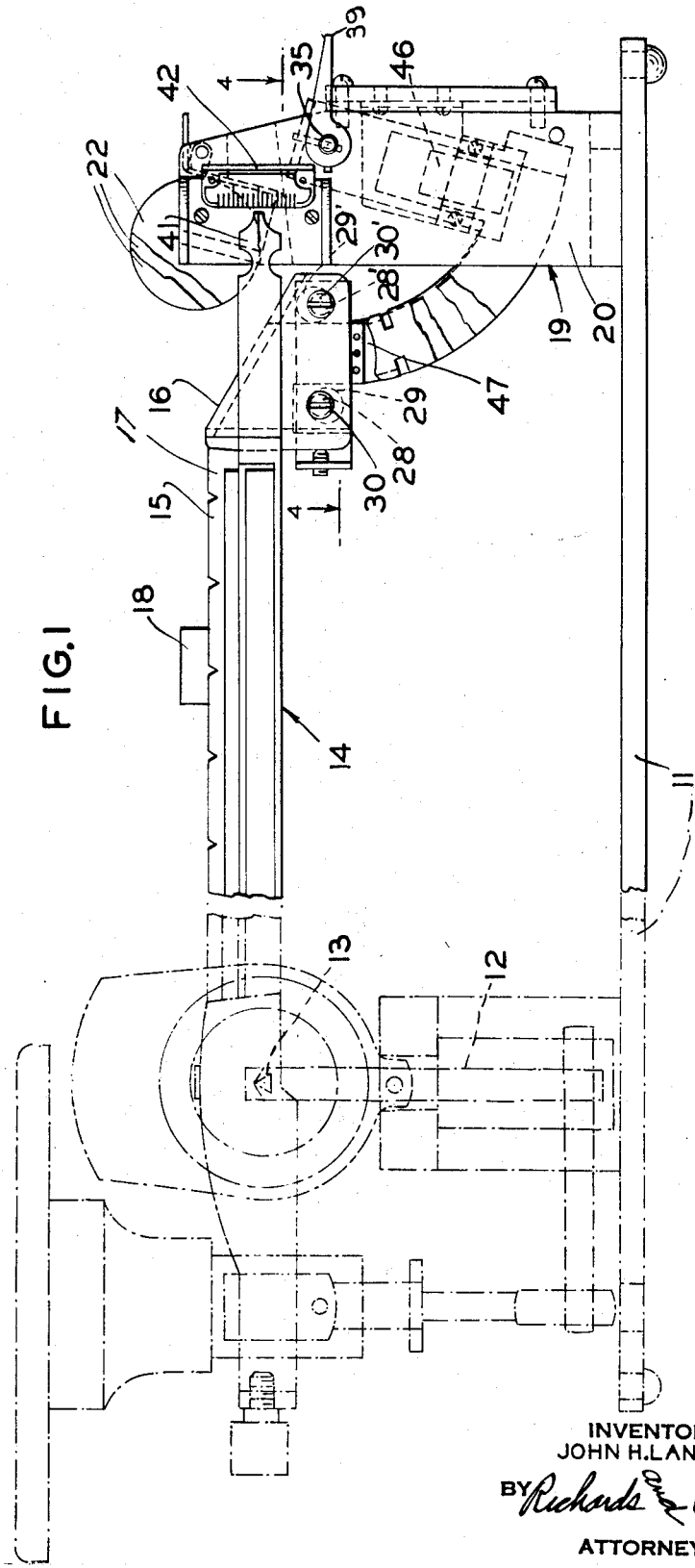
FIG. 1 is a side elevational view of a beam balance weighing scale, showing parts thereof by broken lines, the same being equipped with manipulatable means, according to this invention, for loading and unloading additional counterbalance weight relative to the measuring arm of the scale beam.

Referring to the drawings, the same show an illustrative type of beam balance weighing scale adapted to operate on the balance weighing principle. Said scale comprises a suitable base 11 which supports the beam balance mechanism. Upstanding from said base, adjacent the rearward end portion thereof, is a standard 12 which, by suitable pivoting means 13, supports the beam 14 of the scale system. Said beam provides rear arm 15 by which is carried a platform 16 or the like to receive a weight to be measured, and a forward measuring arm 17. Upon this measuring arm 17 is mounted an adjustable poise 18, manipulatable to balance the weight to be measured up to a predetermined maximum value. The measuring arm 17 may, if desired, also be equipped with a tare poise (not shown), and the scale may further include, if desired, a dial controlled counterbalance means of selected low capacity.

The scale system may be designed to measure weight with reference to any desired weight measuring unit. For example, the beam measuring arm 17 and its adjustable poise 18 (together with the dial controlled counterbalance means, if provided) may be organized to measure weight in units of grams from zero up to a predetermined maximum, e.g., of five or six hundred grams. To measure weights in excess of such maximum, additional counterbalance weight must be applied to the beam measuring arm 17. The present invention relates mainly to provision of novel manipulatable means for quickly loading and unloading such additional weight to and from the weight measuring arm 17. The novel means for this purpose will now be described.

Upstanding from the forward end portion of the base 11, in opposition to the free end of the weight measuring arm 17, is a hollow standard or pedestal 19, open toward the latter, the same having side walls 20. At its upper end, said standard or pedestal 19 is formed to provide a rack means comprising one or more rack compartments 21 to support and store one or more addable weights 22 in an out-of-service position. These rack compartments are also open toward the weight measuring arm 17, and are preferably disposed at a level somewhat above the free end of the latter. Said rack means is defined by said walls 23, a rearwardly and downwardly inclined or sloping bottom wall 24 and/or back wall 25. If more than one rack compartment is provided, the individual compartments are separated, one from another, by intermediate partition means.

The free end of the weight measuring arm 17, to which the standard or pedestal 19 and its additional weight storaging rack is opposed, is of open bifurcate formation, comprising laterally spaced apart side walls 26 and a transverse back wall 27, thus providing pocket means to receive additional weight desired to be applied to said weight measuring arm 17. Means to support the applied additional weight, delivered to said receiving pocket means of weight measuring arm 17, comprises a pair of spaced apart bottom rods 28—28', disposed to extend transversely between the side walls 26 of said weight receiving pocket means, and intermediate the open top and bottom of the latter. Means is provided for adjusting said weight supporting rods 28—28' to so locate and support the received weight toward or from the beam fulcrum 13, as to calibrate the added weight relative to the scale system.

Figure 5:
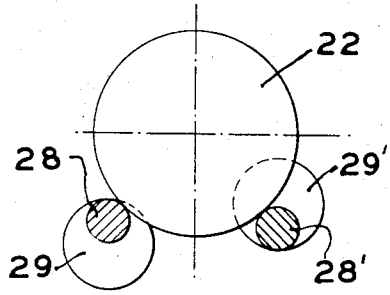
FIGS. 5 and 6 are diagrammatic views showing one structure and method for adjusting the added weight receiving means to properly locate such weight, when deposited on the beam, relative to the fulcrum of the latter, and thus to calibrate the added weight to the scale system.
Figure 6:
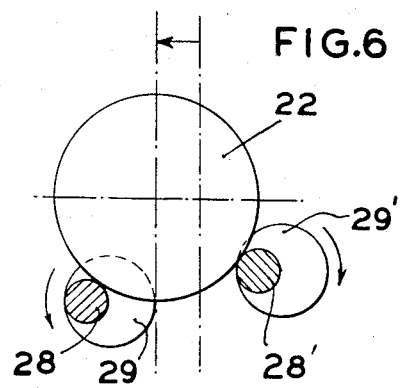
Figure 7:
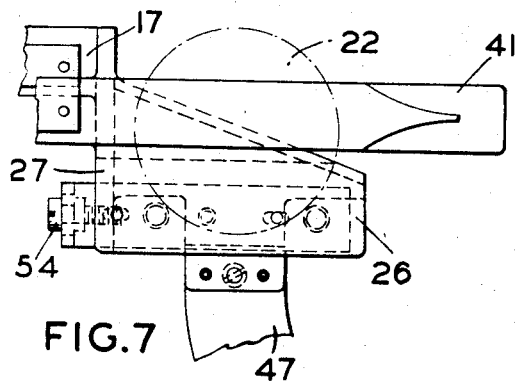
FIG. 7 is a fragmentary side elevation showing a modified structure and method for calibrating the added weight receiving means of the measuring arm of the scale beam relative to the scale system.
Figure 8:
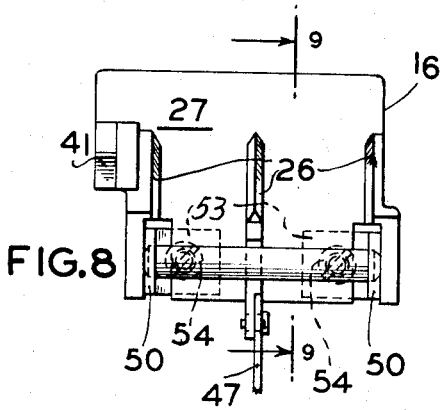
FIG. 8 is an end elevational view, viewed from the right of FIG. 7.
Figure 9:
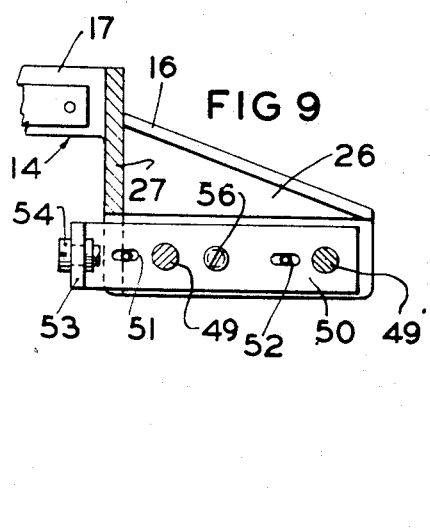
FIG. 9 is a detail longitudinal sectional view, taken on line 9—9 in FIG. 8.
Figure 10:
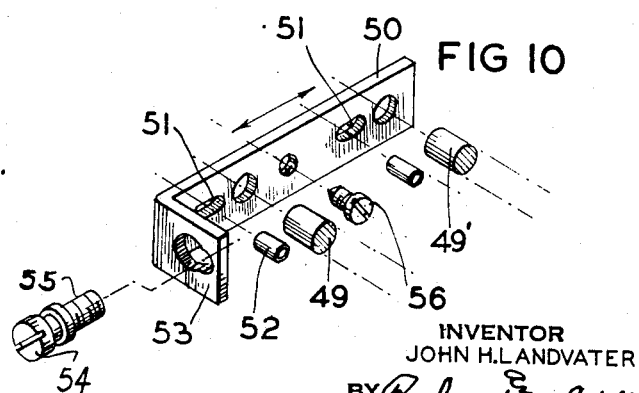
FIG. 10 is a detail exploded fragmentary perspective view of parts of the modified adjusting and calibrating means shown in FIGS. 7, 8 and 9.

In one means for so adjusting the weight supporting rods 28—28', the respective rods are carried by and between respective rotatable eccentrics 29 and 29'. These eccentrics are journaled in the side walls 26 of the weight receiving pocket means, and the same are provided with heads 30 and 30' by which they may be rotatably adjusted. In normal relative positions, the rod 28 extends between upper portions of its eccentrics 29, and the rod 28' extends between lower portions of its eccentrics 29' (see FIG. 5). To shift and locate supported weight or weights 22 toward the beam fulcrum 13, the eccentrics 29 are turned counterclockwise to lower the supporting rod 28, and the eccentrics 29' are turned clockwise to raise the supporting rod 28'. By such adjustments, the supported weight or weights 22 will be shifted inward to locate the center of gravity thereof toward the beam fulcrum 13 (see FIG. 6). Respective opposite rotations of the eccentrics 29—29' will shift the support weight or weights 22 outward, thus locating the center of gravity thereof away from the beam fulcrum 13. In such manner, the added weight applies to the beam 14 a leverage properly calibrated to the scale system.

The additional weight or weights 22 are preferably of rollable body formation, e.g., of circular disc form, spherical form or the like. Owing to such rollable body formation, the weight or weights 22, when supported upon the rearwardly and downwardly inclined bottom wall 24 of the described storage rack means, will roll back against the back wall 25 of said means, and will be thus held against outward displacement from the rack means, unless discharging force is manually applied thereto. Also, owing to such rollable body formation, the weight or weights 22, when delivered from the rack means to the weight receiving means of the weight measuring arm 17, will readily center upon and between the supporting rods 28—28' of the latter.

It will be understood that the additional weight may comprise one or more weights 22. By way of illustration, but not by way of limitation, two such weights are shown in the drawings. If more than one weight is provided, the weight receiving pocket means of the weight measuring arm 17 may be subdivided by intermediate partition means 31, thereby to provide separate pockets for the several weights. Two weights 22, as shown, is deemed to be satisfactory, especially when the weight of material to be determined is in terms of grams. If, in such case, the scale is designed for initial weight determination, by manipulation of its poise or other means, up to a maximum of five or six hundred grams, then if two addable counterbalance weights, each of five hundred grams weight, are provided, the total weighing capacity of the scale will be increased to fifteen or sixteen hundred grams.

It will be obvious that the weight or weights 22 can be ejected from the storage rack means, for delivery to the addable weight receiving means of the scale weight measuring arm 17, merely by finger pressure. It is convenient however, to provide manipulatable means for such operation. As shown, such manipulatable means comprises kicker means 32, pivotally supported in connection with the back wall 25 of the storage rack means, and corresponding in number to the number of weights 22 contained in said rack means. Said kicker means consists in a kicker arm 33, which extends downwardly into the interior of the rack means, behind a weight contained therein, and a depressible finger piece 34 which extends rearwardly outward from the pivotal connection of the kicker means. To eject a weight 22 from the rack means into the receiving means of the weight measuring arm 17, the operator presses down upon the finger piece 34, thus rocking the kicker means 32 whereby to swing forward the kicker arm 33 so as to kick out and propel the engaged weight 22 from the storage rack means into the weight receiving means of the weight measuring arm 17.

Lift means is provided for returning weight, after use, from the receiving means of the weight measuring arm 17 to the weight storage rack means. This lift means comprises a rock shaft 35, which is journaled in the side walls of the standard or pedestal 19, to extend across the hollow interior of the latter, below the storage rack means with which the upper end of the standard or pedestal is provided. Affixed to this rock shaft 35, to depend therefrom, is a lever arm 36, from the lower free end of which extends an outwardly and upwardly projecting arcuate carrier member 37. The carrier member 37 terminates in a laterally projecting bifurcate cradle member 38, the arms of which normally underlie a weight 22, when the latter is lodged in the receiving means of the weight measuring arm 17, and in such manner as to straddle the axis of said weight. The lever arm 36 and its carrier member 37 is stopped in normal lowered position by engagement with a stop bar 40, that is mounted in and across the interior of the standard or pedestal 19. It will be understood that, when more than one addable weight 22 is provided, the number of lever arms 36 and their carrier members 37 will correspond to the number of weights 22. To an exterior end of the rock shaft 35 is affixed a radially extending finger lever 39, by which the rock shaft can be turned.

To return a weight 22 from the receiving means of the weight measuring arm 17 back to the weight storage rack means, after use, the operator depresses the finger lever 39, thus turning the rock shaft 35 clockwise. Such rotation of the rock shaft swings upwardly, the lever arm 36 and its carrier member 37, thereby to carry the cradle member 38 into lifting engagement with a weight 22 lodged in the receiving means of the weight measuring arm 17. Continued upswinging movement of the lever arm and its carrier member and cradle member, carries the lifted weight 22 out of the receiving means of the weight measuring arm up to the addable weight storage rack means, whereby the weight can roll, by gravity, from the cradle member 38 back into the storage rack means for return thereto, until future use is desired.

As is necessary for all beam balance scales, such as here involved, visual means to indicate balanced condition of the scale beam during a weighing operation must be provided. In the instant case, such indicating means comprises a pointer element 41, arranged to extend from the free end of the weight measuring arm 17, to cooperate with a stationary balance indicating mark or scale 42, which, in the instant case, is mounted on a side of the standard or pedestal 19 (see FIG. 1).

In beam balance scales, it is also desirable to provide means adapted to prevent violent oscillations of the beam, whereby its movements are caused to be even, rapid and substantially friction-free. In the instant case, means for this purpose is provided. Such means comprises a yoke frame 43 having laterally spaced apart side walls 44. This yoke frame 43 is secured within the hollow interior of the standard or pedestal 19, by suitable attachment to the back wall 45 thereof. Suitably affixed to the respective interior faces of said side walls 44 are opposed and spaced apart magnetic elements 46. Affixed to the free end portion of the weight measuring arm 17 is a downwardly projecting arcuate arm 47, the free end of which extends toward the standard or pedestal 19 so as to enter the interior thereof. This arm 47 carries an armature plate 48, angularly projecting upwardly therefrom so as to pass between the magnetic elements 46, whereby to be influenced by the latter with scale beam dampening effect, while nevertheless permitting free oscillation of said scale beam.

Referring now to FIGS. 7 to 10 inclusive of the drawings, there is shown therein, in connection with the beams for receiving and supporting additional weight desired to be applied to the scale weight measuring arm 17, another arrangement for adjusting the received weight supporting means relative to the beam fulcrum 13, whereby to calibrate the added weight relative to the scale system. In this modified arrangement, longitudinally spaced apart transverse supporting rods 49–49' are affixed to and extend between carrier plates 50, which are respectively mounted contiguous to the interior faces of the side walls 26 of the weight receiving pocket means with which the weight measuring arm 17 is provided. These carrier plates 50 are provided with slots 51 to engage guide studs 52, that are affixed to said side walls 26, thereby to flexibly support the carrier plates relative to the latter. Said carrier plates 50 extend outwardly through the back wall 27 of the weight receiving pocket means, said back wall being cut away to accommodate passage of the same. The exterior ends of the carrier plates 50 terminate in angular end members 53, which overlap the exterior face of said back wall 27, parallel thereto. Each said end member 53 is provided with a rotatable adjusting screw 54, the threaded shank 55 of which engages with said back wall 27. By turning the adjusting screws 54, the carrier plates 50 may be moved longitudinally, in optional directions, whereby to slide the carried weight supporting rods 49–49' toward or from the beam fulcrum 13, thereby to position the supported weight or weights 22 in properly calibrated relation to the scale system. When such desired adjustment is attained, the carrier plates 50, and the weight supporting rods 49–49' carried thereby, may be immovably fixed against displacement from the attained adjusted position by means of set screws 56, which are respectively threaded through the respective side walls 26 of the weight receiving pocket, adapted to engage and bind the carrier plates in the effected adjusted positions.

The specific embodiments of additional counter-balancing weights and means for receiving and positioning such weights on the measuring arm of the beam described above are merely illustrative of many others which will be apparent to those skilled in the art in view of the present disclosure. Although such receiving and positioning means may be mounted on the beam in a fixed position, it is obviously preferable to provide an adjustable mounting to permit calibration of the weight or weights to the scale system as described above. The primary consideration, of course, is that the weight receiving means and weight be such that when the weight is dropped or placed in the receiving means on the measuring arm, it will come to rest with its center of gravity at precisely the correct previously calibrated distance from the fulcrum. Although cylindrical weights 22 and round supporting rods 28—28' or 49—49' are employed in the illustrated embodiments, other equivalent self-centering combinations of counterbalancing weights and supporting element configurations can be employed. For example, spherical weights could be dropped into hemispherical or other suitably dished receptacles which would automatically position the center of gravity of the spherical weight at precisely the correct previously calibrated distance from the fulcrum. Similarly, weights of many other shapes, such as cubical, conical, pyrimidal or other geometrical shapes could be employed in conjunction with suitably complementarily shaped receptacles, or weights of any shape could be provided with a bore hole adapted to receive a spindle mounted in the weight receiving means in order to accurately position the weight therein.

It will be understood that various other changes and modifications may be made in the hereinabove described structures, and in the details thereof, without departing from the spirit and scope of the disclosed invention, and that only such limitations shall be imposed as may be required by and indicated in the appended claims.

I claim:
1. In a beam balance weighing scale comprising a base having an upstanding beam fulcrum and support, a beam pivoted on the fulcrum of said support, one arm of the beam having means to receive material to be weighed and the other arm of the beam constituting a material weight measuring arm having adjustable measuring counterbalance means cooperative therewith, additional counterbalance weight movable to and from the weight measuring arm, a rack means on the base which is opposed to the outer extremity of the weight measuring arm whereby to support and store said additional counterbalance weight, the weight measuring arm terminating at its outer end in means to receive the additional counterbalance weight when the latter is discharged from said storage rack means thereto, and manipulatable means to carry the additional counterbalance weight, after use, out of said receiving means back to said storage rack means; the improvement which comprises spaced apart supporting rods extending across the receiving means upon and between which the received weight rests, and adjusting means by which said supporting rods are carried, operation of said adjusting means being adapted to move said supporting rods, whereby to shift the supported weight optionally toward or from the beam fulcrum, thereby to calibrate the added counterbalance weight relative to the scale system.

2. In a beam balance weighing scale according to claim 1, wherein the adjusting means by which the supporting rods for the received weight and the weight resting thereon are shifted relative to the beam fulcrum comprise rotatable eccentrics journaled in side walls of the receiving means of the weight measuring arm, said supporting rods being affixed to and extending between opposed eccentrics.

3. In a beam balance weighing scale according to claim 1, wherein the adjusting means by which the supporting rods for the received weight and the weight resting thereon are shifted relative to the beam fulcrum comprise carrier plates slidably supported in connection with the side walls of the receiving means of the weight measuring arm, said carrier plates projecting exteriorly of the back wall of said receiving means and terminating in angular end portions parallel to said back wall, adjusting screws journaled in said end portions having their shanks threaded to and through said back wall, and set screws mounted in the side walls of the receiving means operative to engage and bind the carrier plates against displacement from adjusted positions, said supporting rods being affixed to and extending between said carrier plates.

References Cited
UNITED STATES PATENTS

| | | | |
|---|---|---|---|
| 502,433 | 8/1893 | Gibboney | 177—185 |
| 1,665,722 | 4/1928 | Timson | 177—248 |
| 2,448,477 | 8/1948 | Wasko et al. | 177—185 X |
| 3,215,217 | 11/1965 | Landvater | 177—248 |

RICHARD B. WILKINSON, *Primary Examiner.*

GEORGE H. MILLER, Jr., *Assistant Examiner.*